United States Patent [19]
Fausnight et al.

[11] Patent Number: 5,700,312
[45] Date of Patent: Dec. 23, 1997

[54] UNIVERSAL AUTO LOTION

[75] Inventors: Ronald L. Fausnight, North Canton; David A. Lupyan, Chagrin Falls, both of Ohio

[73] Assignee: Blue Coral, Inc., Cleveland, Ohio

[21] Appl. No.: 812,179

[22] Filed: Mar. 6, 1997

Related U.S. Application Data

[63] Continuation of Ser. No. 517,906, Aug. 22, 1995, abandoned.

[51] Int. Cl.$^6$ ........................................ C09G 1/10
[52] U.S. Cl. ........................... 106/10; 106/3; 106/4
[58] Field of Search ........................... 106/3, 10, 11

[56] References Cited

U.S. PATENT DOCUMENTS

| | | | |
|---|---|---|---|
| 4,013,475 | 3/1977 | Liebowitz et al. | 106/10 |
| 4,592,934 | 6/1986 | Wolstoncroft | 106/10 |
| 4,732,612 | 3/1988 | Steer et al. | 106/10 |
| 4,743,648 | 5/1988 | Hill et al. | 524/731 |
| 5,017,222 | 5/1991 | Cifuentes et al. | 106/10 |

FOREIGN PATENT DOCUMENTS 955975   4/1964   United Kingdom.

*Primary Examiner*—Melissa Bonner
*Attorney, Agent, or Firm*—Calfee, Halter & Griswold LLP

[57] ABSTRACT

An auto finish-treating composition universally useful on paint, metal, vinyl and other plastic finishes comprises micronized wax dispersed in a water/organic solvent emulsion also containing silicone liquid emulsified in both the organic and aqueous phases.

28 Claims, No Drawings

UNIVERSAL AUTO LOTION

This application is a continuation of application Ser. No. 08/517,906 filed on Aug. 22, 1995, now abandoned.

BACKGROUND OF THE INVENTION

The present invention relates to a composition and process for protecting different types of external surfaces found in most modern automobiles and other on-road motor vehicles.

The vast majority of automobiles, trucks, buses and other vehicles on the road today include metal body panels whose exterior surfaces are coated with paint. Many such vehicles also include metal bumpers and/or trim usually plated with chrome or other bright, silvery metal. Many such vehicles also include additional body panels or parts made from vinyl or other plastics, the external surfaces of which are typically embossed with some sort of pattern exhibiting a roughened, non-uniform appearance.

As a vehicle ages, the finish on the vehicle's external surfaces often becomes dull and unattractive. This is due to various causes including wind, weather, sunlight, scratching, rust, exudation of plasticizer from polymers, abrasion from dirt and/other materials, paint degradation through oxidation, and other physical and chemical reactions.

Many products are available today for protecting external automobile surfaces from these adverse effects. These products are referred to hereinafter as "auto finish-treating products". Many of these products will also restore older finishes from a dull, weathered "look" to a like-new condition.

For example, conventional car waxes are often used to protect the attractive, bright, shiny appearance of new car paint finishes. Waxes will also restore paint finishes which have become dulled over time to a like-new condition.

Typically, conventional car waxes contain a wax, such as carnauba wax, dissolved in an organic solvent or dispersed in water. When applied to a painted automobile surface and then vigorously buffed, the wax forms a protective coating which develops a desired shiny appearance due to the surface smoothness of the applied coating. Some modern car waxes also include polishing agents, i.e. particulate abrasives, which abrade away surface irregularities in older vehicles thereby facilitating formation of a smooth wax coating.

Products are also available for protecting and restoring auto finishes based on vinyl and other polymers. For example, various formulations based on silicone, i.e. liquid dimethylpolysiloxanes, are widely used for restoring and protecting vinyl and other plastic parts of automobiles, trucks, buses and so forth. Other products are also available for protecting external metal parts such as bumpers and trim.

Most auto finish-treating products are use-specific in the sense that they can be used only on one type of surface. For example, although waxes are effective in protecting and restoring automobile paint finishes, they do not work well on most vinyl surfaces. This is because wax clogs the surface indentations creating the roughened surface appearance of the vinyl finish, which in turn detracts rather than enhances the surface appearance of the finish. Polishing agents in the wax only make the problem worse, since they are even more visible than the wax itself.

In the same way, auto surface-treating products formulated for use on vinyl and other polymer-based parts are not effective on paint or metal finishes, while products useful on metal finishes are not effective on paints, vinyls or other plastic finishes.

Accordingly, there is a need for a new auto finish-treating product which can be used on all types of finishes, including paint, metal, vinyl and other plastics.

A common feature of practically all wax-containing auto finish-treating products is that they require significant rubbing and/or buffing to be effective. This is not only time-consuming but also requires significant physical effort. Accordingly, a need also exists for a new auto finish-treating product which can be applied very easily, by simple wiping or other application method, without the rubbing or buffing steps normally required with conventional wax-containing products.

SUMMARY OF THE INVENTION

The present invention provides a novel composition for use in protecting and restoring the external surfaces of automobiles, trucks, buses and other on-road vehicles, the composition comprising a dispersion of a micronized wax in a water/organic solvent emulsion also containing dimethylpolysiloxane. In accordance with the invention, it has been found that this composition can be effectively applied by simple wiping without rubbing or buffing. In addition, it has been further found that this composition, when so applied, will restore the bright, shiny appearance of all types of external automobile surfaces which have become dulled and unattractive over time, including paint, vinyl, other plastics and metal, and in addition will form protective coatings providing additional protection against further damage of these surfaces.

Thus, the present invention provides a novel auto surface-treating composition which is universal in its application in that it can be used on different surfaces including paint, metal, vinyl and other plastics. The inventive composition, therefore, can replace the two, three or four different products normally needed for cleaning and restoring all external surfaces a modern automobile or other vehicle. Moreover, because the inventive composition need not be rubbed or buffed, it is far easier to use than conventional waxes whether or not containing added polishing agents.

DETAILED DESCRIPTION

The inventive finishing composition comprises micronized wax dispersed in a water/organic solvent emulsion also containing dimethylpolysiloxane emulsified in the liquid phase.

Micronized waxes are waxes which have been cryogenically ground to extremely fine particle sizes on the order of 3 to 20 microns. Most waxes including soft waxes become brittle when cooled to very low temperatures. In this condition, the waxes can be ground to extremely fine particle sizes and recovered either in powder form or in the form of dispersions in aqueous or organic liquids.

Micronized waxes are used primarily for providing lubricity and water-repellency in paints, stains, inks and other coatings. They are available commercially both in powdered form and in the form of dispersions in a liquid carrier including both water and organic solvents. In accordance with the present invention, micronized waxes are used as a primary component of the inventive compositions for providing smooth, shiny protective coatings on all types of finishes including paint, metal vinyl and other plastics.

The average particle size of the micronized waxes used in the present invention can vary widely and essentially any average particle size can be used. Thus, average particle sizes on the order of 3 to 20 microns are useful, although average particle sizes of 5 to 15 microns are preferred, while particle sizes of 7 to 9 microns are even more preferred.

The type of wax used to make the micronized wax component of the inventive compositions can also vary widely. Micronized waxes available commercially are made from a wide variety of different waxes, and any such micronized wax product can be used in accordance with the present invention. For example, micronized waxes made from natural waxes such as carnauba wax, Candelilla, and Ozokerite can be used. Also, micronized waxes made from synthetic waxes such as polyethylene wax, polypropylene wax, polyamide wax, etc., can also be used. Specific examples of commercially available micronized waxes useful in the present invention are the series of micronized waxes sold under the mark CERIDUST® by Hoechst Celanese Corporation of Somerville, N.J. and the series of micronized waxes sold under the designation AQUA WAXES®, AQUA BEAD WAX®, and MICROSPERSION WAXES sold by Micropowders, Inc., of Terrytown, N.Y.

In a preferred embodiment of the invention, mixtures of two or more different types of waxes are employed. For example, mixtures of low molecular weight polyethylene waxes and paraffin waxes are particularly suitable for use in the present invention. In a particularly preferred embodiment of the invention, a mixture of a CERIDUST® brand wax sold by Hoechst Celanese Corporation, particularly CERIDUST® 9630 F and an AQUA BEAD wax sold by Micropowders, Inc., particularly AQUA BEAD 916, is used.

In still another preferred embodiment of the invention, other micronized polymers can be used in addition to the wax component. In this regard, it is already known that micronized polytetrafluoroethylene (PTFE) can be used in combination with micronized waxes to achieve higher surface lubricity and anti-blocking properties in other environments. Micronized polytetrafluoroethylene can also be included in the finish-treating compositions of the present invention to increase lubricity and water repellency thereof. Other micronized polymers such as polyamide and the like can also be used.

The amount of micronized wax included in the inventive finishing compositions can vary widely. For example, 0.5 to 10% by weight, can be used, although amounts on the order of 1 to 6 wt. % are preferred, while amounts on the order of 1.5 to 3 wt. % are particularly preferred. Also, if an additional micronized polymer such as polytetrafluoroethylene is included in the system, the amount of this component present can be on the order of 0.01 to 2%, preferably 0.05 to 1%, even more preferably 0.1 to 0.5%, based on the total weight of the composition.

In accordance with the present invention, the micronized wax component is dispersed in a liquid carrier which comprises a water/organic solvent emulsion. This emulsion may be either an oil-in-water emulsion or a water-in-oil emulsion, although water in oil emulsions are preferred.

The organic solvent used in forming the liquid carrier can be selected from a wide variety of commercially available materials. In this regard, because the wax used in the inventive finishing composition is micronized, there is no need to dissolve this wax component in the organic solvent portion of the liquid carrier. For this reason, and because the composition will be applied by hand, it is desirable to use organic solvents which exhibit comparatively low solvency and vapor pressures.

The ability of an organic solvent to dissolve various solutes, i.e. its solvency, is typically measured in terms of its Kauri-butanol value as determined by ASTM D-113. In accordance with the present invention, organic solvents having a Kauri-butanol value of no higher than about 45, preferably no higher than 35, more preferably no higher than 30, are employed. Such organic solvents should also have a relatively low vapor pressure, i.e. on the order of no higher than about 6, preferably no higher than 3, even more preferably no higher than 1.0, mm Hg at 20° C.

Many different commercially available organic solvents can be used in accordance with the present invention. For example, a range of white mineral oils, normal paraffins, chlorinated organic solvents and synthetic isoparaffinic solvents fall within the foregoing requirements. Thus, mineral spirits or mineral thinner, kerosene, terpines, chlorinated organic solvents, and certain dearomatized aliphatic hydrocarbon solvents such as those sold by Exxon Chemical Company of Houston, Tex. under the designation EXXSOL® can be used.

A preferred class of organic solvents is the synthetically produced isoparaffinic solvents available from Exxon Chemical Company of Houston, Tex. under the designation "Isopar." These materials are highly aliphatic, synthetically produced organic solvents containing a high percentage (50 to 99+%) of isoparaffins and having a vapor pressure at 38° C. of about 100 mm Hg or less as determined by ASTM D2879, and kauri-butanol values of about 25 to 29.

In accordance with a preferred embodiment of the invention, a mixture of solvents is employed, particularly a mixture of a "low-boiling" solvent and a "high boiling" solvent. For best results, the low-boiling solvents should have a vapor pressure of about 0.5 to 6, preferably 0.8 to 4.0, more preferably 1 to 2.5, mm Hg at 20° C. In the preferred compositions of the present invention, the low-boiling solvent used is one which, if applied to a surface neat without wiping dry, would evaporate within about 10 to 60, preferably 15 to 30 minutes. In general, this translates to the low-boiling organic solvent having a boiling point, or more typically a boiling point range, of from about 150° to 250° C. (about 300° to 480° F.), more typically about 15° to 200° C. (about 300° to 390° F.).

Many different commercially available materials will serve as low boiling solvents in the inventive composition. For example, conventional mineral spirits or mineral thinner, kerosene, terpines, chlorinated organic solvents and the EXXSOL solvents of Exxon Chemical Company mentioned above are examples of low-boiling organic solvents which can be used.

A preferred low-boiling organic solvent is mineral spirits, particularly Type I mineral spirits or thinner, meeting ASTM D235 (Stoddard Solvent). This material is composed of roughly half paraffins and half aromatics and napthenes and exhibits initial boiling points of roughly 140° to 170° C. (about 290° to 340° F.), final boiling points of no higher than about 205° C. (about 400° F.) and solvencies, measured as kauri-butanol values, of approximately 25 to 45, more particularly about 30 to 40.

The high-boiling solvents used in the present invention have a relatively low vapor pressure, i.e. lower than about 1.0 mm Hg at 20° C., preferably 0.5 mm Hg at 20° C. or less. More preferred high-boiling solvents have vapor pressures of less than 0.3, more preferably less than 0.1 mm Hg at 20° C. In the preferred high-boiling solvents, this translates to a boiling point range of roughly 250° C. to 315° C. (480° to 600° F.), although solvents with other boiling point ranges can be employed.

Many different commercially-available organic solvents are useful as the high-boiling solvents of the present invention. For example, a wide range of white mineral oils and normal paraffins meet these specifications. A preferred class of high-boiling organic solvents is the Isopar solvents mentioned above, particularly those having a vapor pressure at 38° C. of about 10 mm Hg or less, preferably 4 mm Hg or less, as determined by ASTM D2879.

Specific examples of high-boiling organic solvents useful in the present invention are:

| High Boiling Solvent | K-B Value | Vapor Pressure (mm Hg at 20° C.) |
|---|---|---|
| Isopar M | 27 | 0.1 |
| Isopar V | 25 | <0.1 |
| Kerosene | 34 | 0.4 |
| 460 Solvent | 32 | 0.23 |
| Mineral Seal Oil | 27 | <0.1 |
| Witco PD-23 | 25.5 | 0.01 (at 24° C.) |
| Witco PD-25 | 23.5 | 0.005 (at 24° C.) |
| Chemcentral 140 | 30 | 0.5 |

The amount of organic solvent to be included in the inventive compositions can also vary widely. Typically, the inventive finishing compositions will contain about 3 to 40%, more preferably 10 to 25%, more preferably about 12 to 18% organic solvent, by weight. Both the amount and volatility of the organic solvent play a role in determining how long the inventive composition can be exposed to the atmosphere before it can no longer be used. Accordingly, the identity and amount of solvent should be selected to ensure that the working time of the inventive composition is sufficient for its intended use.

Where a mixture of a low-boiling and a high-boiling solvent is used, the ratio between the two can vary widely. Preferred compositions will contain sufficient low boiling solvents so that the amount of low boiling solvent is >0 to 90, preferably >0 to 85, weight % of the total organic solvent content of the composition. Depending on the identities of the different solvents employed, the weight ratios of the low to high boiling organic solvents may be between 0.1/1 to 1/10, more preferably 0.5/1 to 1/1.

The other component of the liquid carrier of the inventive finishing composition is water. The amount of water that can be used in the inventive compositions can vary widely. However, it is desirable that the inventive compositions exhibit the body and viscosity of conventional hand lotions, and accordingly it is desirable to limit the water content of the compositions so that these physical properties will be achieved. Typically, this means that the water content of the inventive compositions will be between about 50 to 95%, more typically 65 to 85%, even more typically 70 to 80%. Also, it is also desirable that the total amount of liquid carrier in the inventive compositions, i.e., the sum of the water content and the organic solvent content be from 50 to 96%, preferably 85 to 95%, more preferably about 87 to 94% by weight.

An additional important component of the inventive finishing composition is silicone, i.e. a liquid dimethylpolysiloxane. A wide variety of silicone liquids are available commercially. Typically, these liquids are composed substantially completely of dimethylpolysiloxane, although substituted dimethylpolysiloxane substituted with various other ingredients are also known. In accordance with the invention, any conventional dimethylpolysiloxane can be used.

Dimethylpolysiloxane liquids are typically defined by their viscosities with lower viscosity silicones being easier to spread on a surface but yielding coatings exhibiting smaller amounts of shine. In accordance with the present invention, silicone liquids having viscosities on the order of 100 to 10,000, preferably 150 to 1,000, more preferably 200 to 500, centipoise can be employed. Also, the amount of silicone liquid included can vary widely. Amounts on the order of 1 to 15 wt. %, more preferably 2 to 10 wt. % can be used. Amounts on the order of 1 to 10, more preferably 1.5 to 8, even more preferably 2.5 to 6.5 wt. %, are especially useful.

In this connection, there is a relationship between viscosity and amount of silicone liquid to be included in the inventive finishing compositions which is helpful to observe for proper formulation. Higher viscosity silicones are more difficult to distribute evenly on a surface, and accordingly a comparatively less amount of this type of silicone fluid should be employed. At the same time, silicone fluids which are either too low in viscosity or too low in amount will result in an insufficient shine being imparted to the surface to be treated. On the other hand, an insufficient amount of a high viscosity silicone leads to non-uniform application and hence the formation of streaks. Basically, higher amounts of higher viscosity silicones are acceptable for vinyl surfaces but will smear metal, while lower quantities of lower viscosity silicones work with metal but do not shine vinyl. Accordingly, the identity and amount of particular silicone liquid to be included in a particular inventive composition should be selected so as to achieve the desired combination of properties in terms of ease of application and degree of shine desired. This can easily be determined by routine experimentation.

In order to form a stable system of the liquid silicone in the liquid carrier, it is also desirable to include in the inventive compositions a suitable emulsifier or emulsifiers.

The type of emulsifier to be included depends on the phase, aqueous or organic, in which it is desired for the silicone liquid to reside. If the silicone liquid is intended to remain dispersed or emulsified in the organic phase, then a water-in-oil emulsifier such as Span 80 (sorbitan monooleate) or sorbitan laureate should be used. If it is desired that the silicone liquid reside in the aqueous phase, then an oil-in-water emulsifier should be employed. Examples of suitable oil-in-water emulsifiers are morpholine oleate, triethanolamine oleate, ethoxylated alcohol and ethoxylated nonylphenol.

Silicone liquids are available commercially in the form of aqueous emulsions as well as neat, i.e. undiluted. In this connection, if an aqueous emulsion is used as the source of the silicone liquid, a suitable oil-in-water emulsifier will most probably already be present in the silicone emulsion so that an additional emulsifier is unnecessary. If, on the other hand, an undiluted silicone liquid is used as the source, then an emulsifier should also be included.

It is particularly desirable in accordance with the invention that a silicone liquid reside in both the organic phase as well as the aqueous phase of the inventive finish-treating compositions. In accordance with the present invention, it has been found that the inventive compositions will exhibit the best combination of properties if both the aqueous and organic phases contain a silicone. Preferably at least 10%, more preferably at least 20%, even more preferably at least 35%, of the total silicone liquid content of the inventive compositions is included in each of the organic and aqueous phases. If the silicone is omitted from the aqueous phase, then the shine developed on vinyl surfaces may be less than desired. Similarly, if the silicone is omitted from the organic phase, then the shine developed on metal and paint finishes may be less than desired. Including silicone in both aqueous and organic phases allows the inventive finish-treating composition to develop the desired shiny, like-new appearances on the widest possible variation of different finish surfaces and therefore is preferred.

In order to ensure that silicone liquid is present in both the aqueous and organic phases, it is desirable to include both water-in-oil and oil-in-water emulsifiers in the system. In addition, it is further desirable to adopt a manufacturing procedure in which the organic phase and aqueous phase are separately formulated in a first operation and then the two phases are brought together in a second operation to form the completed composition.

It is also possible in accordance with the present invention to include other conventional ingredients in the inventive finishing compositions. Examples of such conventional components are dyes, colorants, fragrances and so forth. Such components may have an effect on the stability of the inventive composition. Accordingly, care should be taken in using such components to ensure that appropriate types and amounts of these additional ingredients are selected and appropriate amounts of additional emulsifiers are added to account for any such effects these components might have.

As mentioned above, the finishing compositions of the present invention are applied by a simple wiping or other application technique, no rubbing or buffing being necessary. Rather, all that is necessary is that composition be spread relatively uniformly over the surface to be protected with any excess material being wiped away. Upon evaporation of the liquid carrier, the inventive composition will form a smooth protective coating making the underlying surface to which it has been applied exhibit a shiny, "like-new" appearance.

To this end, the inventive composition is preferably formulated to have a consistency resembling a relatively thick lotion such as exhibited by commercially-available skin lotions and the like. Thus, the inventive compositions typically have viscosities on the order of 4,000 to 50,000 centipoise as determined by Brookfield viscometer. Preferred compositions have viscosities on the order of 6,000 to 40,000 centipoise, even more preferably 8,000 to 30,000 centipoise.

WORKING EXAMPLES

In order to more thoroughly illustrate the present invention, the following working examples were conducted.

Example 1

A finish-treating composition produced in accordance with the present invention was made by first separately forming an organic phase composition and an aqueous phase composition and thereafter combing the two compositions together. In formulating both the organic phase composition and the aqueous phase composition, the various ingredients indicated in the following table were added to the organic solvent or water in the order indicated with vigorous mixing. Thereafter, the organic and aqueous phases were combined together, also under vigorous mixing, produce the product composition.

| Component Type | Component Identity | Component Amount, wt. % |
|---|---|---|
| Organic Phase Composition | | |
| Solvent | Mineral Spirits | 10 |
| Solvent | low volatility isoparaffin solvent (Isopar M) | 5 |
| Emulsifier | Sorbitan Monooleate (Span 80) | 0.5 |
| Silicone liquid | 350 Centistoke Silicone Liquid | 2.5 |
| Micronized Wax and PTFE | 70% low molecular weight polyethylene wax + 30% PTFE (Ceradust 9630F) | 1 |
| Micronized Wax | Micronized Paraffin Wax (Aquabead 916) | 1 |
| Fragrance | | 0.2 |
| Aqueous Phase Composition | | |
| Water | Water | 76.8 |
| Silicone Liquid | 60% aqueous emulsion of 350 Centistoke Silicone (SM 2163) | 3 |

The product exhibited a viscosity of 12,000 cps. In addition, it did not separate out into separate organic an aqueous phases, nor did the wax or PTFE particles separate out, upon standing for 30 days at room temperature.

The product composition was applied by squeezing from a plastic bottle onto either a soft cotton cloth or the painted metal panel of an automobile exterior. The product was easily wiped with either a back and forth or a circular motion to distribute the product evenly across the painted surface. The product essentially dried as it was wiped leaving a smooth uniform shine on the surface. In addition, the surface exhibited increased water repellency, surface slip, and distinctness of reflected image comparable to a traditional wax.

The product was applied to a soft vinyl surface, again wiping with a soft cotton cloth until the applied coating was smooth and uniform. In one portion of the vinyl surface, a single heavier coat of the composition was applied, while in another portion several light coats were applied. In both cases, the applied coatings resulted in gloss levels and improvements in appearance similar to commercial water based silicone protectants now on the market.

The product was also lightly applied to the glass surfaces of the automobile and buffed until clear, uniform and smear free. The resulting surface repelled water and was easier to maintain with standard wiper blades for improved visibility as compared to untreated glass.

Other automobile surfaces including rubber, plastic trim, chrome, aluminum, fiberglass, and various types of wheels, including clear coated surfaces, were treated with the product, again using a soft cotton cloth to wipe on a smooth coating of material. The result obtained on each surface was with similar to the excellent results achieved on the painted surface described above.

Example 2

The procedure of Example 1 was repeated except that the organic phase composition and the aqueous phase composition were changed as follows:

| Component Type | Component Identity | Component Amount, wt. % |
|---|---|---|
| Organic Phase Composition | | |
| Solvent | low volatility isoparaffin solvent (Isopar M) | 10 |
| Solvent | very low volatility isoparaffin solvent (Isopar V) | 5 |
| Emulsifier | sorbitan monooleate (Span 80) | 0.5 |
| Silicone liquid | 350 Centistoke Silicon Fluid | 2.5 |
| Nuocept C | preservative formulation | 0.2 |
| Micronized Wax and PTFE | 70% low molecular weight polyethylene + 30% PTFE (Ceradust 9630F) | 1 |
| Micronized Wax | Micronized Paraffin Wax (Aquabead 916) | 1 |
| Fragrance | | 0.5 |
| Aqueous Phase Composition | | |
| Water | Water | 76.3 |
| Silicone Liquid | 60% aqueous emulsion of 350 Centistoke Silicone (SM 2163) | 3 |

The product exhibited a viscosity of 21,000 cps. In addition, it did not separate out into separate organic and aqueous phases, nor did the wax or PTFE particles separate out, upon standing for 14 days at room temperature.

The results obtained when this composition was applied to various automobile surfaces were similar to those obtained with the composition of Example 1. However, in this case, it was easier to apply the composition of Example 2 to an even application, particularly when the automobile surfaces were warm to the touch, as often happens in the summer. This resulted in even less effort, more satisfactory results, and a more pleasant experience.

From the foregoing, it can be seen that the present invention provides a unique auto finish-treating composition which can be used on a wide variety of different automobile surfaces including paint, metal, vinyl and other plastics and which is also very easy to supply and use. Furthermore, it has also been found that the inventive composition will lessen or often completely remove from rubber or vinyl trim previously entrapped waxes and polishing agents from earlier wax applications. A traditional wax often leaves white or gray residues behind in dark trim areas that cannot be removed by ordinary washing. The inventive composition, it has been found, not only avoids this problem but rectifies previous problems in this regard.

Although only a few embodiments of the present invention have been described above, it should be appreciated that many modifications can be made without departing from the spirit and scope of the present invention. For example, while the inventive composition can be applied to a clean car to avoid abrasion of the surface with dirt particles, it can also be used on a lightly soiled paint surface. In this application, the product will clean both the fine dust particles from the surface and the oil based soils that have penetrated more deeply into the paint, vinyl or other areas. All such modifications are intended to be included within the scope of the present invention, which is to be limited only by the following claims.

We claim:

1. A finish-treating composition for enhancing the appearance of the external surfaces of an automobile or other vehicle, said composition comprising a dispersion of
   (a) micronized wax,
   (b) water,
   (c) an organic solvent having a vapor pressure of no more than 6 mm Hg at 20° C., and
   (d) a silicone liquid is selected from a substituted or unsubstituted dimethylpolysiloxane emulsified in both said water and said organic solvent.

2. The composition of claim 1, wherein said silicone liquid is dimethylpolysiloxane.

3. The composition of claim 2, wherein said composition has a viscosity of 4,000 to 50,000 centipoise and wherein said dimethylpolysiloxane has a viscosity of 100 to 10,000 centipoise.

4. The composition of claim 3, wherein said composition further includes at least one emulsifier.

5. The composition of claim 2, wherein said composition includes a first emulsifier for emulsifying dimethylpolysiloxane in said organic solvent and a second emulsifier for emulsifying liquid dimethylpolysiloxane in said water.

6. The composition of claim 5, wherein the average particle size of said micronized wax is 3 to 20 microns.

7. The composition of claim 6, wherein said composition further contains micronized fluorocarbon polymer.

8. The composition of claim 7, wherein said organic solvent is composed of a low boiling organic solvent having a vapor pressure of 0.5 to 6 mm Hg at 20° C. and a high boiling solvent having a vapor pressure of less than 1 mm Hg at 20° C., both said high boiling solvent and said low boiling solvent having Kauri-butanol values of no higher than 45.

9. The composition of claim 3, wherein said organic solvent is composed of a low boiling organic solvent having a vapor pressure of 0.5 to 6 mm Hg at 20° C. and a high boiling solvent having a vapor pressure of less than 1 mm Hg at 20° C., both said high boiling solvent and said low boiling solvent having Kauri-butanol values of no higher than 45.

10. The composition of claim 9, wherein said composition contains
   (a) 0.5 to 10% micronized wax,
   (b) 50 to 95% water,
   (c) 3 to 40% organic solvent, and
   (d) 1 to 15% silicone liquid, said silicone liquid being dimethylpolysiloxane.

11. The composition of claim 10, wherein at least 10% of the total dimethylpolysiloxane content of said composition is emulsified in said organic solvent, and further wherein at least an additional 10% of the total dimethylpolysiloxane content of said composition is emulsified in said water.

12. The composition of claim 11, wherein said composition further contains 0.01 to 2% fluorocarbon polymer.

13. The composition of claim 10, wherein said composition contains
   (a) 1 to 6% micronized wax,
   (b) 60 to 85% water,
   (c) 10 to 25% organic solvent, and
   (d) 2 to 10% of a silicone liquid, said silicone liquid comprising dimethylpolysiloxane.

14. The composition of claim 13, wherein at least 20% of the total dimethylpolysiloxane content of said composition is emulsified in said organic solvent, and further wherein at least an additional 20% of the total dimethylpolysiloxane content of said composition is emulsified in said water.

15. The composition of claim 14, wherein said composition further contains 0.05 to 1.0% fluorocarbon polymer.

16. An auto finish-treating composition universally useful on paint, metal, vinyl and other plastic finishes comprising micronized wax dispersed in a water/organic solvent emulsion, said composition also containing silicone liquid emulsified in both said organic solvent and said water.

17. A process for producing a protective coating on at least one external surface of a motor vehicle, said external surface comprising paint, metal, vinyl or other plastic, said process comprising applying the composition of claim 16 to said surface without buffing to form a smooth wax coating thereon.

18. The process of claim 17 wherein said process comprises applying said composition to both a paint surface and a vinyl surface of the motor vehicle.

19. The composition of claim 16 wherein said silicone liquid is dimethylpolysiloxane and further wherein said dimethylpolysiloxane is emulsified in both said organic solvent and said water.

20. The composition of claim 16 wherein said composition is stable.

21. A process for providing a protective coating on the surfaces of a motor vehicle, said surfaces being selected from the group consisting of paint, metal, vinyl or other plastic, glass, rubber and fiberglass, said process comprising applying a composition to at least one of said surfaces, said composition comprising micronized wax dispersed in a water/organic solvent emulsion, said composition containing silicone liquid emulsified in said organic solvent and silicone liquid emulsified in said water.

22. The process of claim 21, wherein said composition is applied to at least two of the above surfaces, and further wherein said two surfaces are on the motor vehicle.

23. The process of claim 22, wherein said composition is applied to at least a vinyl surface of said motor vehicle.

24. The process of claim 23, wherein said composition is applied to at least a paint surface and a vinyl surface of the same vehicle.

25. The process of claim 24, wherein said composition is applied to said surfaces without buffing to form a smooth wax coating thereon.

26. The process of claim 25, wherein said composition contains dimethylpolysiloxane emulsified in both said organic solvent and said water.

27. The process of claim 26, wherein said composition is spread uniformly over the surfaces to which said composition is applied by wiping without buffing and thereafter allowing the water and organic solvent in said composition to evaporate to thereby form a smooth, protective coating on said surfaces.

28. The process of claim 24, comprising spreading said composition uniformly over the surfaces to which said composition is applied by wiping without buffing and thereafter allowing the water and organic solvent in said composition to evaporate to thereby form a smooth, protective coating on said surfaces.

* * * * *